(12) United States Patent
Giles et al.

(10) Patent No.: US 6,935,605 B2
(45) Date of Patent: Aug. 30, 2005

(54) COMPUTER KEYBOARD WITH RELEASE CLIP

(75) Inventors: John T. Giles, Kenosha, WI (US); Wayne A. Pietluck, Pleasant Prairie, WI (US); Anthony J. Ceschin, Kenosha, WI (US); Brian K. Carpenter, Racine, WI (US)

(73) Assignee: TG3 Electronics Incorporated, Kenosha, WI (US)

( * ) Notice: Subject to any disclaimer, the term of this patent is extended or adjusted under 35 U.S.C. 154(b) by 0 days.

(21) Appl. No.: 10/357,877

(22) Filed: Feb. 4, 2003

(65) Prior Publication Data

US 2004/0149872 A1 Aug. 5, 2004

(51) Int. Cl.[7] ............................................... F16M 11/00
(52) U.S. Cl. ............. 248/918; 248/221.11; 248/225.21; 224/553
(58) Field of Search ................... 248/918, 613, 248/221.11, 222.11, 225.21; 224/553, 282, 42, 38, 548, 557; 400/715, 717, 718; 361/683, 686

(56) References Cited

U.S. PATENT DOCUMENTS

| | | | |
|---|---|---|---|
| 4,718,740 A | 1/1988 | Cox ........................... 312/208 |
| 4,826,123 A | 5/1989 | Hannah et al. ............. 248/248 |
| 4,903,221 A | 2/1990 | Krenz ........................ 364/708 |
| 4,913,390 A | * 4/1990 | Berke ....................... 248/176.3 |
| 4,964,661 A | 10/1990 | Cadwell et al. ............. 248/183 |
| 5,229,757 A | 7/1993 | Takamiya et al. ........... 340/711 |
| 5,247,285 A | 9/1993 | Yokota et al. ............... 345/169 |
| 5,283,714 A | 2/1994 | Tsai et al. .................... 361/683 |
| 5,287,245 A | 2/1994 | Lucente et al. ............. 361/680 |
| 5,312,144 A | 5/1994 | Yoshida et al. .......... 292/251.5 |
| 5,341,929 A | * 8/1994 | Stefancin, Jr. .............. 206/320 |
| 5,387,010 A | 2/1995 | Mohr .......................... 281/43 |
| 5,409,275 A | 4/1995 | Yoshida et al. .......... 292/251.5 |
| 5,438,936 A | 8/1995 | Wang ........................... 108/44 |
| 5,441,229 A | 8/1995 | Spagnoli ..................... 248/452 |
| 5,485,793 A | 1/1996 | Crowell ........................ 108/44 |
| 5,487,521 A | 1/1996 | Callahan .................. 248/441.1 |
| 5,489,121 A | 2/1996 | Mohr .......................... 281/43 |
| 5,510,953 A | 4/1996 | Merkel ........................ 361/680 |
| 5,555,491 A | 9/1996 | Tao ............................. 361/686 |
| 5,673,628 A | 10/1997 | Boos ............................ 108/44 |
| 5,749,306 A | 5/1998 | Breuner ........................ 108/44 |
| 5,751,548 A | * 5/1998 | Hall et al. .................. 361/686 |
| 5,769,248 A | * 6/1998 | Johnson ...................... 211/106 |
| 5,826,840 A | * 10/1998 | Yun ............................ 248/118 |
| 5,859,762 A | 1/1999 | Clark et al. ................. 361/686 |
| 5,966,285 A | 10/1999 | Sellers ....................... 361/686 |
| 6,021,720 A | 2/2000 | Boos et al. ................... 108/44 |
| 6,092,774 A | 7/2000 | Choy ........................ 248/298.1 |
| 6,119,994 A | 9/2000 | Price ........................ 248/176.1 |
| 6,135,404 A | 10/2000 | Wisniewski et al. ... 248/281.11 |
| 6,135,405 A | 10/2000 | Jones et al. ............. 248/281.11 |
| 6,176,456 B1 | 1/2001 | Wisniewski ............ 248/281.11 |
| 6,213,438 B1 | 4/2001 | Ostby et al. .............. 248/276.1 |
| 6,382,580 B1 | * 5/2002 | Wisniewski .............. 248/316.4 |
| 6,386,413 B1 | * 5/2002 | Twyford ..................... 224/553 |
| 6,491,268 B1 | * 12/2002 | Channer et al. .......... 248/176.1 |
| 6,543,949 B1 | * 4/2003 | Ritchey et al. ............. 400/691 |
| 6,585,201 B1 | * 7/2003 | Reed ....................... 248/181.1 |
| 6,604,720 B1 | * 8/2003 | Wilson ..................... 248/177.1 |

* cited by examiner

Primary Examiner—Leslie A. Braun
Assistant Examiner—Steven M. Marsh
(74) Attorney, Agent, or Firm—Jansson, Shupe, Munger & Antaramian

(57) ABSTRACT

A keyboard-holding device detachably holds a keyboard to a stationary support. The keyboard is of the type having keys and a shell surrounding the keys. The shell has a front surface, a back surface, and a bottom surface. The keyboard-holding device has a first elongate member, a pivot, and a locking mechanism. The first elongate member has a first end, a second end, and a pivot located between the first and second ends. The locking mechanism is attached with respect to the second end for unlockably locking the first elongate member to a holder, said holder fixedly attachable to the support. A fulcrum is rotatably attached with respect to the pivot and fixedly attached with respect to the shell. A spring mechanism provides a restoring force tending to maintain the locking mechanism in locked engagement with the holder, but is manipulable to unlock the shell from the holder.

9 Claims, 13 Drawing Sheets

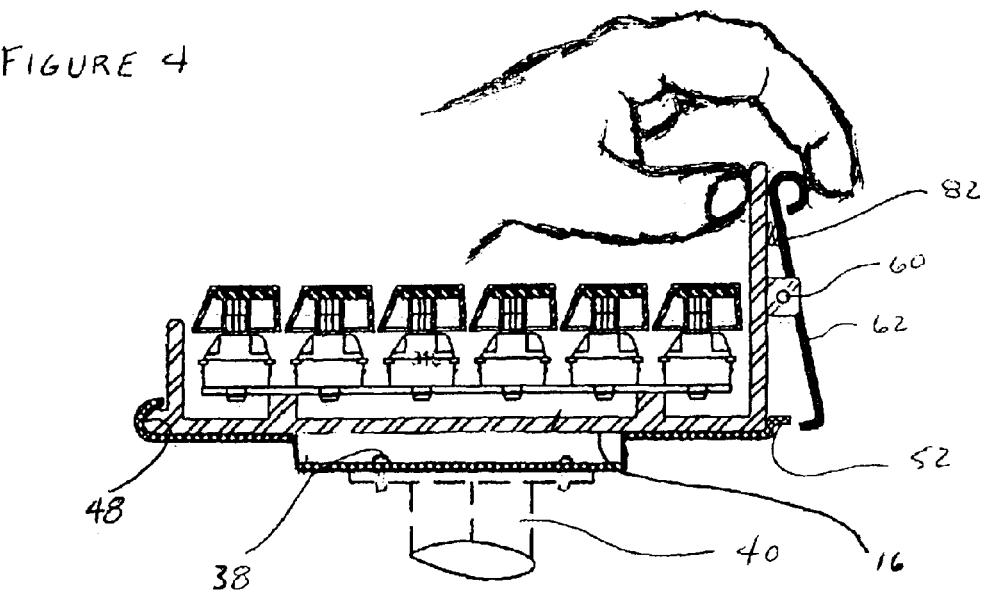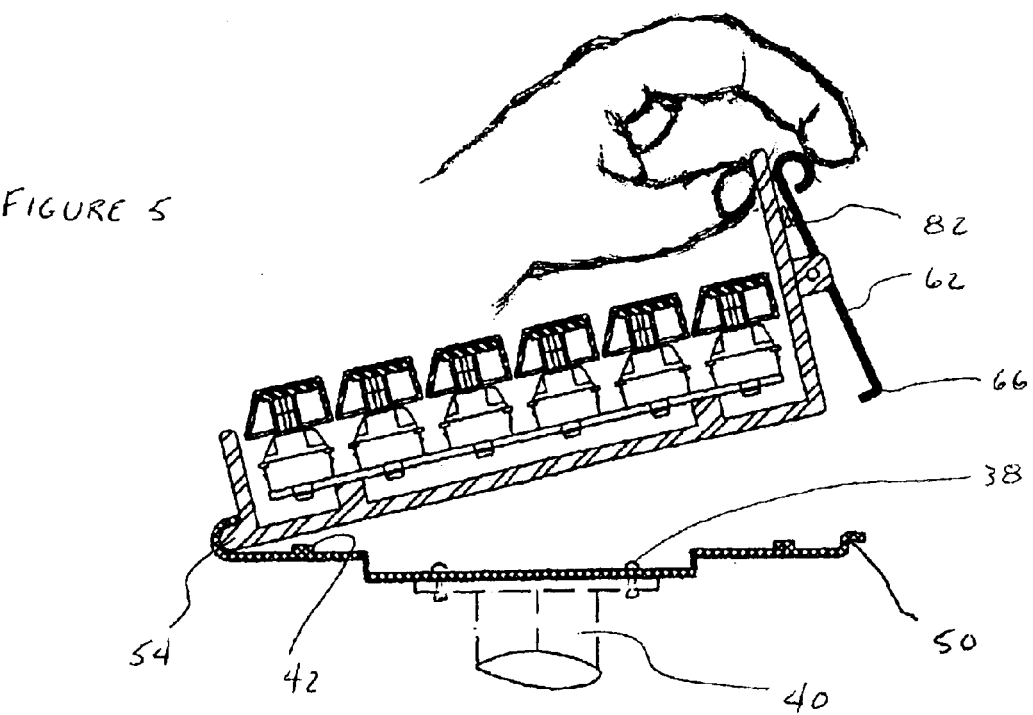

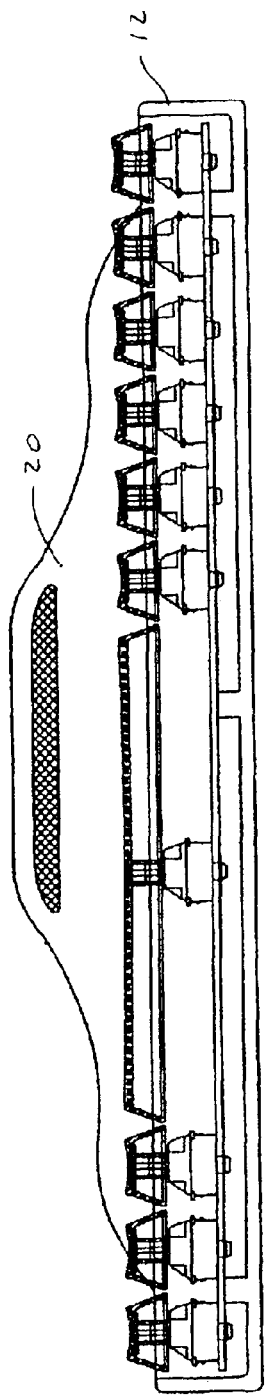
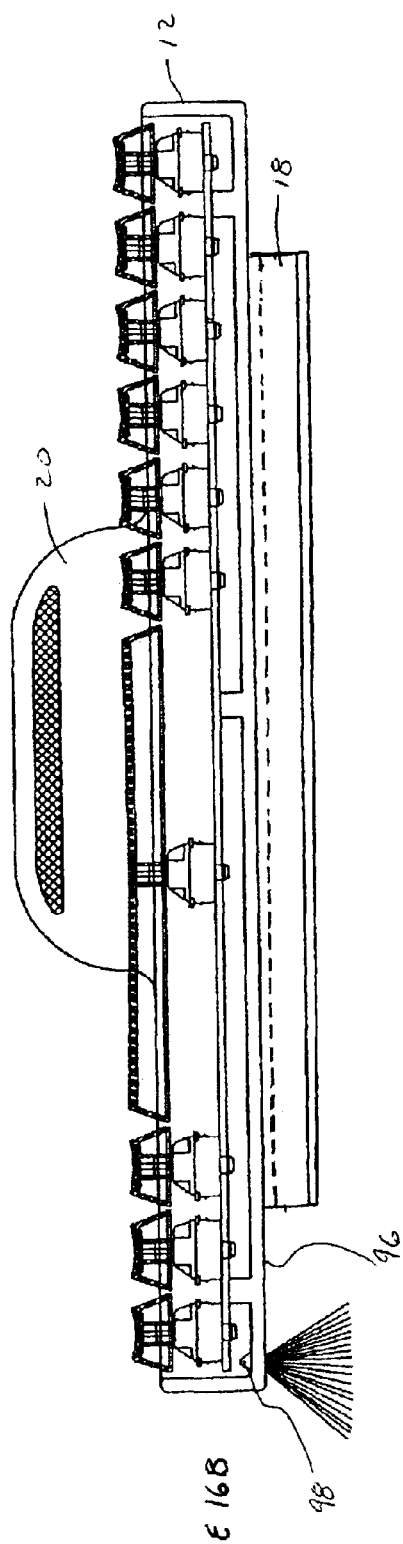

COMPUTER KEYBOARD WITH RELEASE CLIP

FIELD OF THE INVENTION

This invention relates to mounting devices for computer hardware components, more particularly releasable mounting devices for keyboards.

BACKGROUND OF THE INVENTION

It is becoming commonplace for police cruisers to have as standard equipment installed therein a computer with communication capability to a remote source. The computers used within the squad cars typically fall into one of two categories: a common laptop mounted within the squad car or a specially designed, compact terminal with a separate keyboard specially designed for squad car use. This latter two-part configuration involves a keyboard flexibly attached to the terminal. The flexibly-attached keyboards are placed on a shelf or platform.

In squad cars utilizing the two-part configuration, it is desirable for the officer to be able to remove the keyboard portion and place it on his or her lap as the officer is sitting behind the steering wheel of the cruiser. In this manner, the officer may utilize the ergonomics of the seat (facing in a forward direction) while the officer enters information such as driver's license requests, reports, etc.

While it is desirable to have the keyboard easily moveable from the pedestal, which is a support affixed to the squad car, to the officer's lap, it is also necessary, given high speed chases and other hazardous driving activities of an officer, that the keyboard be secured within the passenger compartment of the cruiser when not in use for data entry. Thus it is the case that in the conventional embodiments of these devices, there is a securing mechanism to hold the keyboard to the pedestal.

These conventional models have a common drawback. In each case, they require the use of two hands in order to dislodge the keyboard from the pedestal. This is generally characterized by the pressing of a release button or other switch with the one hand while pulling the keyboard from a cradle with the other hand. While a two-handed operation is not impossible for most police officers, it is not desirable.

There are several problems the two-handed system has over a single (right) handed operation. First and foremost, it is annoying and bothersome as a driver of a police squad car to be required to reach over one's body with one's left arm while attempting to twist to reach a unit to the officer's right. This is exacerbated by the Kevlar vests worn by most officers, which further limit rotational mobility of the officer's torso. In addition to the vests, unlike civilians, a police officer typically has a utility belt outfit with gun holsters, handcuffs holders, and, in some instances, night sticks, which further limit rotational mobility. Second, in stretching the left arm across the body in a rotational motion of the torso, the left arm loses a bit of its mobility thereby making the removal operation difficult and uncomfortable. Third, the location of the pedestal within the vehicle is limited by the reach of the officer with his or her left arm.

Alternatively, if a keyboard unit was available such that it could be removed from its base with a single hand, and in particular with the right hand, rather than be limited to distance by the reach of the left arm stretching across the body, the unit can be placed further from the officer within the passenger compartment, but still remain within the reach of the officer. Moreover, if a single-handed mechanism was easy to operate, it would not require divided attention from the officer which is an important safety consideration even in routine traffic stops. Finally, rather than force older officers or those otherwise susceptible to back injury to perform an operation of the present art while in a rotated position, a single-handed operable device, minimizes the risk of back injury.

OBJECTS OF THE INVENTION

It is an object of the invention to provide an improved mounting device for a computer keyboard overcoming some of the problems and shortcomings of the prior art, including those referred to above.

Another object of the invention is to provide a computer keyboard that may be easily mounted to a support in a car.

Another object of the invention is to provide a keyboard that is removable from a mounting pedestal through the use of one hand.

It is another object of this invention to provide a keyboard that may be detachably mounted within a car, which maximizes the location options for placement of the mount, while still allowing the driver to access the keyboard without leaving the driver's seat.

Still another object of the invention is to provide a device to connect a computer keyboard to a pedestal in a police cruiser which is removable by a police-officer driver without requiring the officer to reach across his or her body.

It is yet another object of the invention to provide a device to connect a computer keyboard to a support that can reduce injuries of a driver due to twisting in an attempt to remove a keyboard from its mount.

It is still another object of the invention is to provide a device to connect a computer keyboard to a support that is easy to manufacture.

How these and other objects are accomplished will become apparent from the following descriptions and the drawings.

SUMMARY OF THE INVENTION

The invention involves a keyboard-holding device for detachably holding a keyboard to a stationary support. The keyboard may be of the QWERTY format with common, computer-directed extension, or may be custom. Regardless, the keyboard is of the type having keys and having a shell surrounding the keys. The shell has a front surface, a back surface, and a bottom surface. The keyboard-holding device has a first elongate member, a pivot, and a locking mechanism. The first elongate member has a first end and a second end. The term "first elongate member" includes, but is not limited to, locking levers and rods. The pivot is located between the first end and the second ends of the first elongate member. The locking mechanism is attached with respect to the second end for unlockably locking the first elongate member to a holder, said holder fixedly attachable to the support. A fulcrum is rotatably attached with respect to the pivot and fixedly attached with respect to the shell. By use of the phrase "fulcrum is rotatably attached with respect to the pivot", applicants are describing relative motion between the first elongate member and the shell, and broadly define fulcrum to allow the phrase to mean any motion between the two components, including a lateral, see-saw motion about the pivot and including a rotational motion about the longitudinal axis of the first elongate member. An elastic device is attached with respect to the shell and with respect to the first elongate member. The elastic device is any compressible spring mechanism which can provide a restoring force tending to maintain the locking mechanism in locked engagement with the holder, but is manipulable to unlock the shell from the holder.

It is preferable for the spring mechanism to be of a resilient material, such as rubber or mechanical, such as a coiled spring. In some applications a torsional spring is appropriate.

It is a preferable embodiment of this invention to comprise a second elongate member, such that the coiled spring is attached with respect to the first elongate member and the second elongate member.

In another preferable embodiment of the device making use of the coiled spring, the coiled spring is attached with respect to the shell and with respect to a portion of the first elongate member between the second end and the pivot. It is another preferable version to attach the coiled spring with respect to the shell and with respect to a portion of the elongate member between the first end and the pivot. In this latter version, it is more preferable for the holder to have a J-shaped catch for engagement with at least one of the surfaces of the keyboard shell. It is even more preferable when using the J-shaped catch to configure the front surface of the keyboard shell to be convex and to be dimensioned to snugly engage the J-shaped catch.

It is also preferable for the keyboard-holding device utilizing the coiled spring attached with respect to the shell and with respect to a portion of the elongate member between the first end and the pivot to further have a bottom surface configured to be complementary in shape to a discontinuous upper surface of the holder. It is even more preferable wherein the upper surface of the holder has at least one pem.

A second aspect of the invention is a keyboard-mounting device for mounting a keyboard to a fixed support or pedestal. This keyboard-mounting device has a front face, a back face, and bottom face. The keyboard-mounting device has a substantially flat tray. The tray has a top surface, a fore edge, and an aft edge. The tray also has an attachment mechanism for detachably attaching the tray to the support. The keyboard-mounting device also has a single-handed release mechanism moveably attached with respect to the keyboard to disengageably engage the tray. In this way, with one hand, a person may move the single-handed release mechanism and thereby release the keyboard from the tray.

It is preferable for this keyboard-mounting device to have the release mechanism include a retaining member for disengageable engagement with the tray. It is more preferable for the release mechanism to have a resilient member with a restoring force tending to maintain the retaining member in locked engagement with the tray.

It is preferable for the keyboard-mounting device to have the retaining member slidably or rotatably attached with respect to the keyboard.

In one preferred embodiment, the tray has a J-shaped catch for engagement with at least one of the faces of the keyboard. It is more preferable for the front face to be convex and dimensioned to snugly engage the J-shaped catch.

In another preferred embodiment, the keyboard-mounting device has a bottom face is configured to be complementary in shape to a discontinuous upper surface of the tray. The discontinuity of the upper surface of the tray can include at least one pem. It is desirable to add a second pem and use the pems as guiding pins extending from the tray to engage complementary concavities in the underside of the keyboard. This latter feature assures proper location of the keyboard on the tray and provides an added measure of security when the keyboard is engaged with the tray.

A keyboard-mounting device facilitating easy, single-handed detachment from a support pedestal would be an important improvement in the art.

BRIEF DESCRIPTION OF THE DRAWINGS

FIG. 4 is a cross-sectional side view of the housing and bracket with the locking mechanism released.

FIG. 5 is a cross-sectional side view of the housing in partial engagement with the bracket and with the locking mechanism released.

FIG. 16A is a front sectional view of one back wall embodiment.

FIG. 16B is a front sectional view of another back wall embodiment with the housing engaged with the mounting bracket.

DETAILED DESCRIPTION OF PREFERRED EMBODIMENTS

Figure 1:
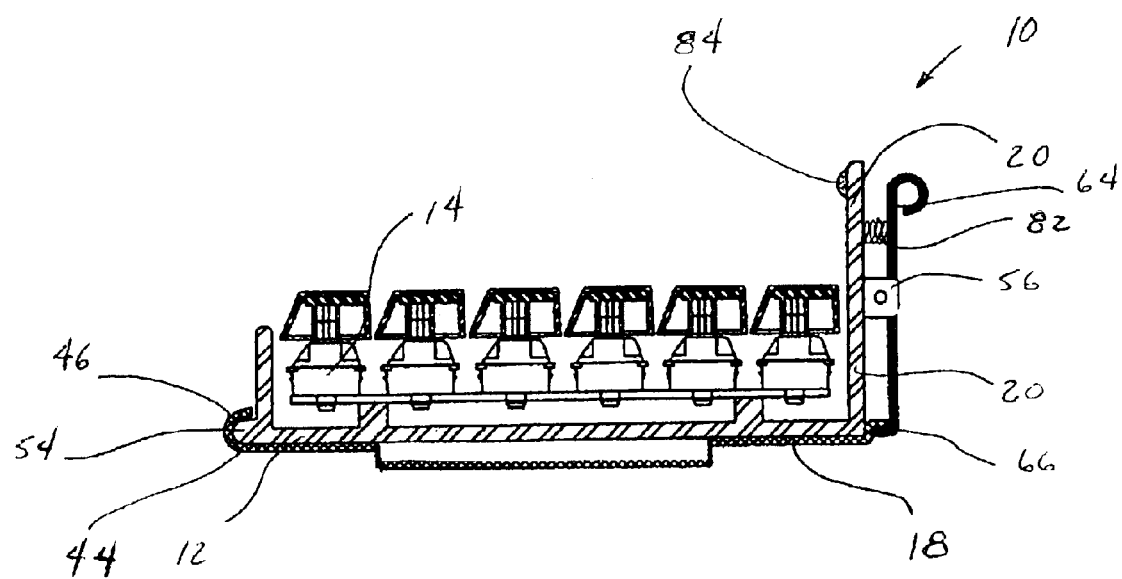
FIG. 1 is a cross-sectional side view of a preferred embodiment of this invention.

FIG. 1 shows a preferred embodiment of a device 10. Device 10 has a plastic housing 12 containing keycap/switch combinations 14 attached in a typical array (e.g. comprising the alphabet in QWERTY format with other word-processing keys such as "shift" and "space bar", function keys, and a numeric pad).

Figure 15:
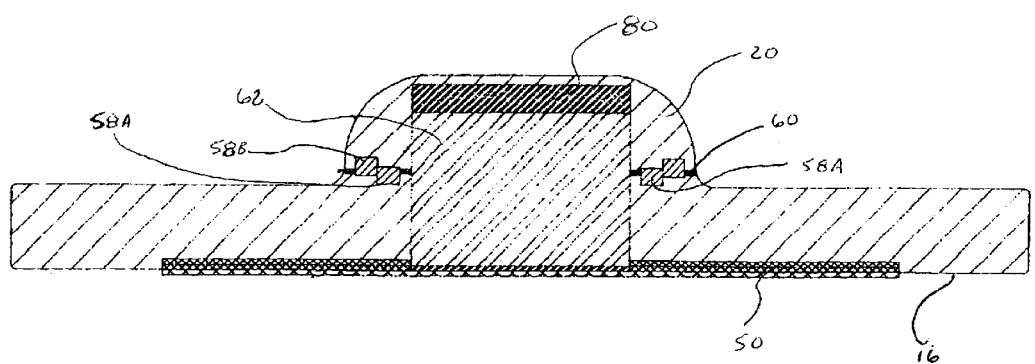
FIG. 15 is a back view of the bracket and housing engaged.

A floor 16 of housing 12 is nestled in a mounting bracket 18 (better seen in FIGS. 4 and 15). Mounting bracket 18 can be of any rigid, non-fragile material, but metals such as aluminum or steel are preferred for their strength at relative thin dimensions, cost, and ease of fabrication. Extending up from back of housing 12 is a back wall 20. Back wall 20 is shown perpendicular to floor 16, but such angular relationship is not required by the invention. In practice, the angle will be dictated by the ergonomics and aesthetics of the pedestal and components. As it is desirable for the locking mechanism to be depressed in a roughly horizontal manner, it is desirable for disengagement that back wall 20 to be vertical with respect to the user's body; therefore, if the pedestal leaves the bracket 18 in a significant angle with respect to horizontal, it may be desirable for back wall 20 to be at an angle greater than 90° with respect to the remainder of housing 12.

Figure 2:
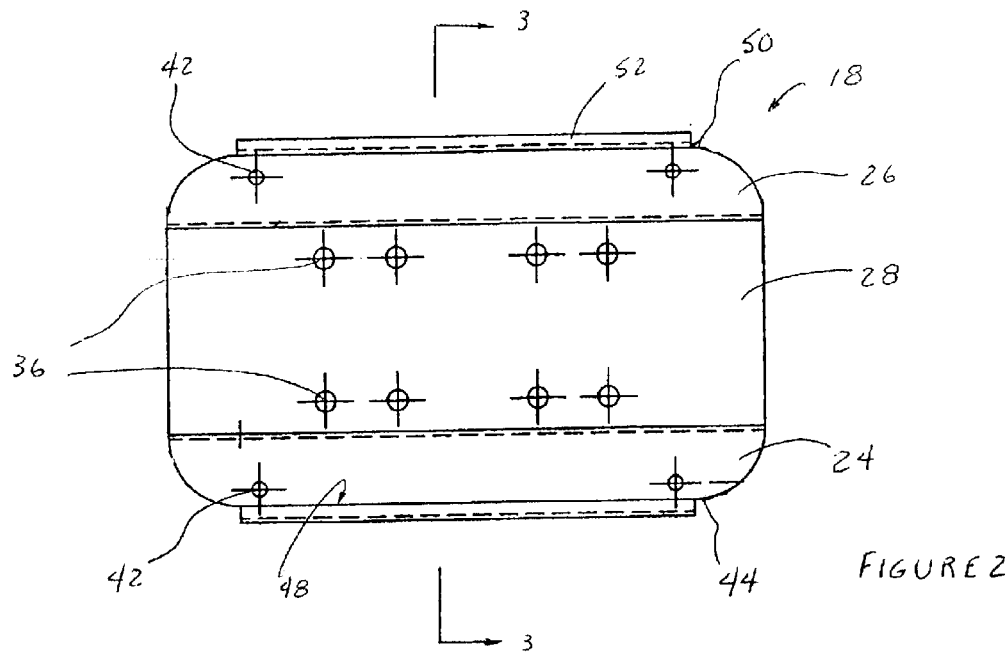
FIG. 2 is a top view of a mounting bracket.
Figure 3:
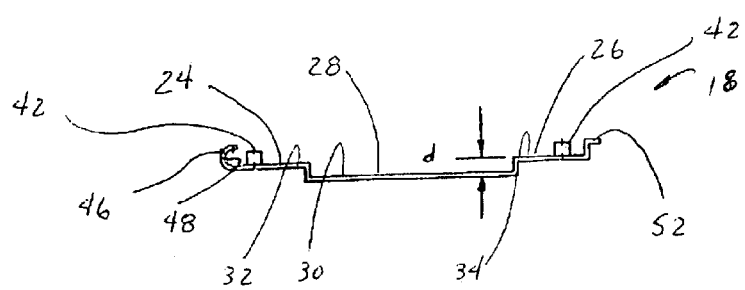
FIG. 3 is a side view of the mounting bracket.

FIGS. 2 and 3 show mounting bracket 18. Mounting bracket 18 has a front housing-receiving-tray section 24 and a rear housing-receiving-tray section 26. Located between front and rear housing-receiving-tray sections 24, 26, is pedestal-mounting section 28.

Figure 14:
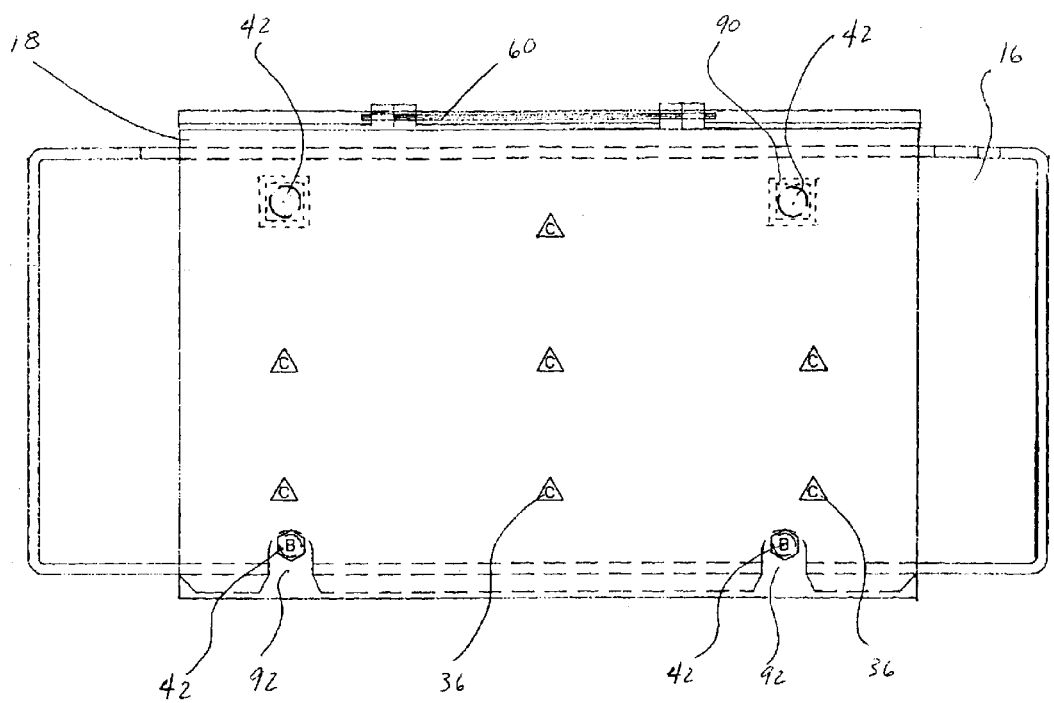
FIG. 14 is a bottom view of the bracket and housing engaged.

As best seen in FIG. 3, upper surface 30 of pedestal-mounting section 28 is recessed a distance "d" from a plane established by front and rear top surfaces 32, 34, of front and rear housing-receiving-tray sections 24, 26, respectively. Spaced throughout pedestal-mounting section 28 are eight mounting holes 36. It is easily seen that eight is not a required number of holes; any number of fasteners capable of sturdy connection are sufficient. As seen in FIG. 14, seven mounting holes 36 are provided. Mounting holes 36 extend through mounting bracket 18 to allow bolts 38 to extend therethrough to secure mounting bracket 18 to pedestal 40 (shown in FIG. 4). Pedestal 40 is pre-fixed in the squad car to provide a support for device 10.

The recess between top surfaces of housing-receiving-tray sections 32, 34 and upper surface 30 is designed to accommodate heads of bolts 38.

Four pems 42 are spaced around front and rear housing-receiving-tray sections 24, 26. Pems 42 extend up from top surfaces 32, 34.

Along a front mounting edge 44 of front housing-receiving-tray section 24 is J-hook catch 46 providing an interior concave receiving-portion 48. At an upstanding back mounting edge 50 of rear housing-receiving-tray section 26 is a horizontal ledge 52.

Housing 12 has a forward nose 54 extending convexly along a portion of the front of housing 12. Along back wall 20 is a pivot 56. For ease of manufacture by molding, pivot 56 consists of upwardly-facing knuckles 58a and downwardly-facing knuckles 58b, each with rod-receiving troughs 59, aligned such that an axle rod 60 may extend therethrough (as best seen in FIGS. 14 and 15).

Referring to FIGS. 5–8, attached to housing 12 by means of axle rod 60 is locking lever 62. Locking lever 62 has an upper end 64 and a lower end 66. Locking lever 62 also has a front face 68 and a back face 70. Extending perpendicularly out from front face 68 are two pivot tabs 72. Drilled through pivot tabs 72 are rod holes 74 designed to be slightly larger than the diameter of axle rod 60 to allow axle rod 60 to extend therethrough and to then allow locking lever 62 to rotate freely about axle rod 60. Upper front corner 76 of pivot tab 72 is rounded to facilitate the pivoting motion. Lower front corner 78 of pivot tab 72 makes an angle of about 69° with respect to front face 68. As can be seen, tabs 72 may be easily manufactured from a rectangular blank of sheet metal by means of pre-drilling rod holes 74, stamping the body of tabs 72 out from the blank, and bending the tabs 72 out perpendicular to front face 68.

Figure 8:
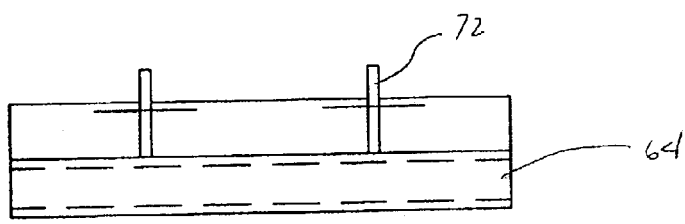
FIG. 8 is a top view of the locking lever.
Figure 7:
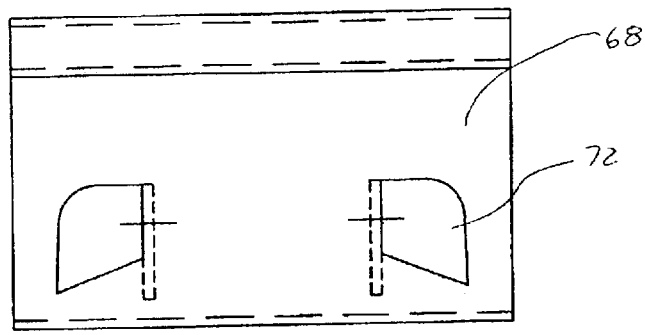
FIG. 7 is a rear view of the locking lever.
Figure 6:
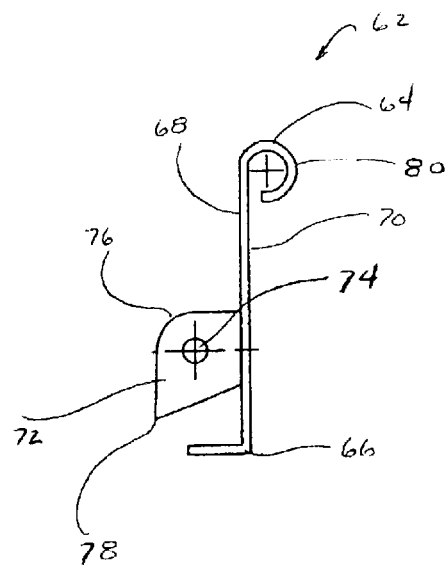
FIG. 6 is a side view of the locking lever.

Upper end 64 is preferably configured to have a thumb grip member 80. It is preferable for thumb-grip member 80 to be ergonomically designed. As illustrated in FIGS. 6, 7, and 8, thumb-grip member 80 can be fabricated inexpensively by curving the upper portion of a sheet metal blank.

Figure 9:
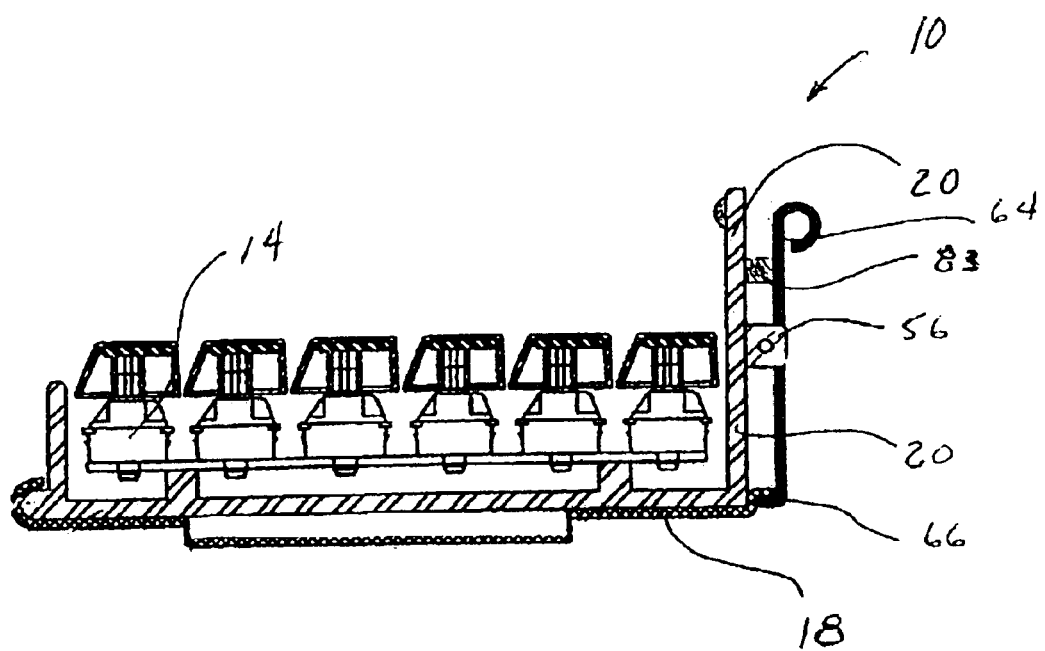
FIG. 9 is a cross-sectional side view of another preferred embodiment of this invention utilizing a rubber spring mechanism.

As shown in FIGS. 1, 4, and 5, attached to locking lever 62 at a point between pivot 56 and upper end 64 is a compressible spring 82 with a restoring force. Spring 82 is also attached to back wall 20, in a manner such that spring 82 tends to force back wall 20 and upper end 64 away from each other. It is well-understood that other means are equally acceptable to provide a restoring force; such means include, but are not limited to a torsional spring about the axle rod or a resilient rubber-like portion placed between the back wall 20 and upper end 64 (as seen in FIG. 9).

Lower end 66 of locking lever 62 is hooked to allow engagement with horizontal ledge 52 of mounting bracket 18. As seen in FIG. 4, when finger pressure is applied to upper end 64 to pull upper end 64 toward back wall 20, locking lever 62 is rotated about pivot 56, releasing lower end 66 from horizontal ledge 52. Similarly, as seen in FIG. 1, when pressure is released, restoring force from spring 82 directs upper end 64 of locking lever 62 away from back wall 20 thereby engaging lower end 66 with horizontal ledge 52.

Figure 10:
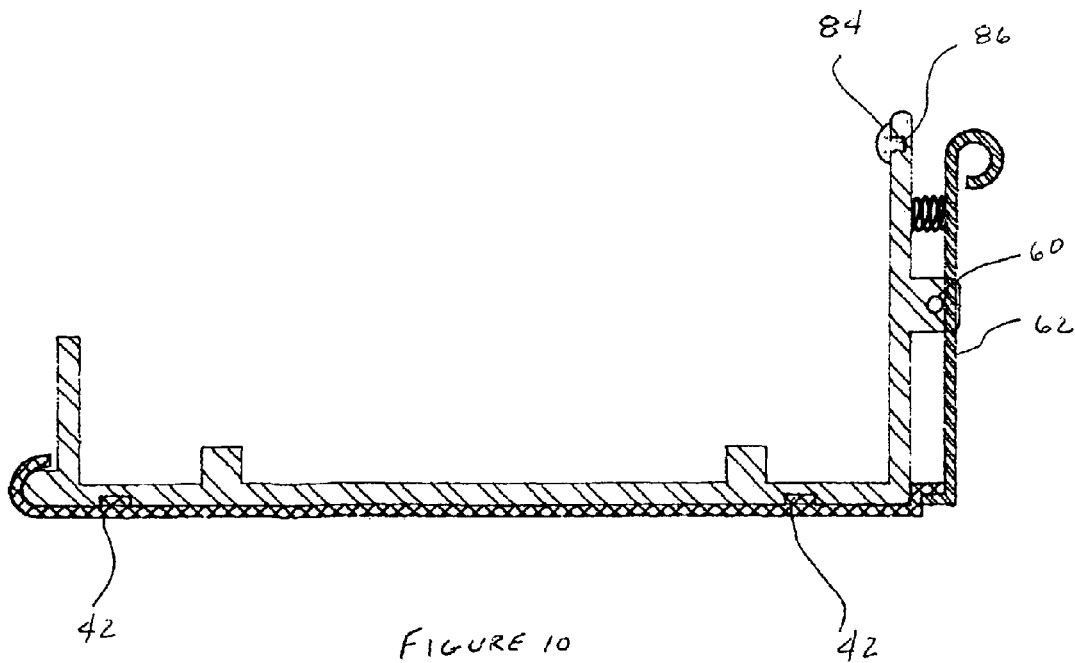
FIG. 10 is a cross-sectional side view of the housing and bracket with the locking mechanism and pems engaged.
Figure 11:
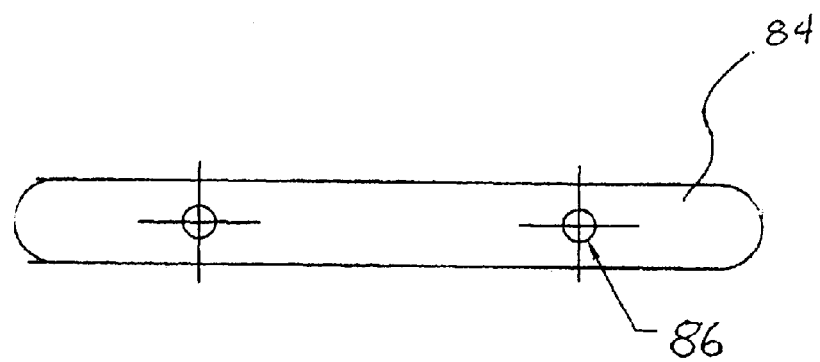
FIG. 11 is a front view of the thumb pad.

To facilitate application of finger pressure, thumb pad 84 is attached to upper wall 20. As seen in FIGS. 10 and 11, thumb pad 84 has thumb pad screw holes 86 to allow thumb pad 84 to be either screwed or riveted to back wall 20 through complementary back-wall screw holes 86 in back wall.

Figure 12:
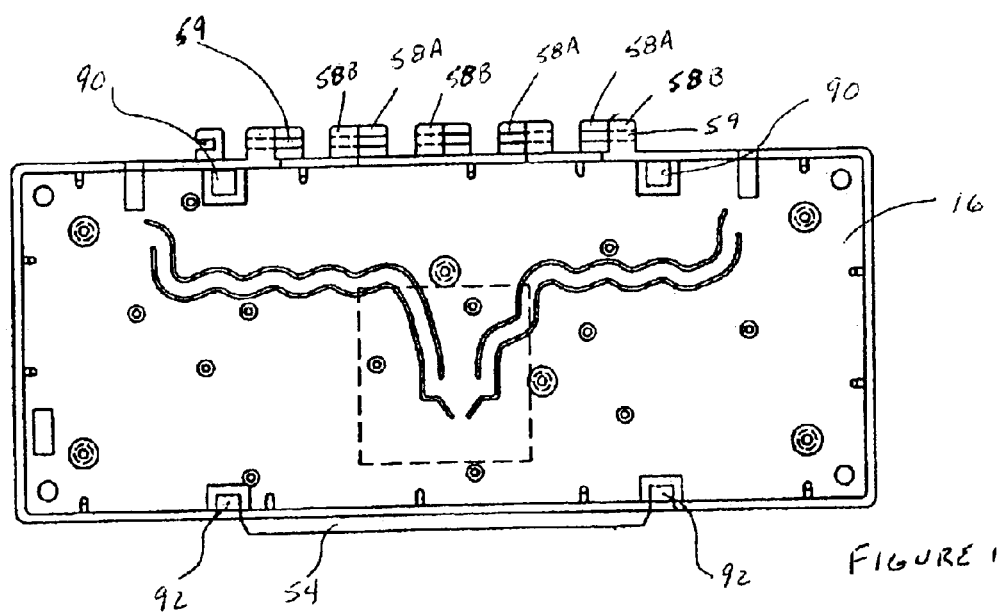
FIG. 12 is a bottom view of the floor of the housing.
Figure 13:
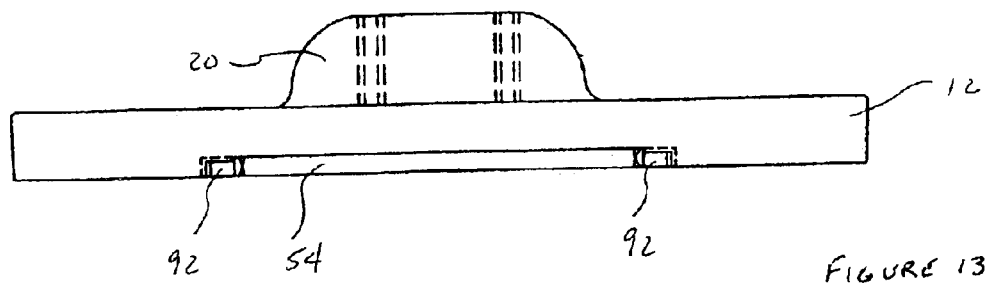
FIG. 13 is a front view of the housing showing the nose and front-pem slots.

FIG. 12 shows floor 16. Back pem-receiving holes 90 are concavities with square-shaped boundaries having a width substantially similar to the diameter of the head of pem 42, to totally surround pem 42 when engaged (as also seen in FIG. 10). When engaged such that back pems 42 are enclosed by back pem-receiving holes 90, any horizontal direction by the housing 12 is prevented. Front pem-receiving holes 92, as illustrated in FIG. 12 and 13, are also concavities with square-shaped boundaries having a width substantially similar to the diameter of the head of pem 42, but are open to the front of housing 12 creating a slot. In such slotted front pem-receiving hole version, front pem-receiving holes 92 act as guides in the installation process, to easily center housing in left/right horizontal direction. To further act as efficient guides, alternatively, front pem-receiving holes 92 may have flared walls open to front of housing 12, as illustrated in FIG. 14, in order to more easily "catch" front pems 42 and direct housing 12 to the proper location on mounting bracket 18. Front pem-receiving holes 92 may also be fully bordered to be identical to back pem-receiving holes 90.

FIGS. 1, 4, 5, illustrate the engagement and disengagement process. To install and engage device 10, mounting bracket 18 is first affixed to pedestal 40 through bolts 38. Housing 12 is angled into mounting bracket 18 such that nose 54 engages concave receiving portion 48 of the J-hook catch 46. If front pem-receiving holes 92 are of the fully-bordered version, front pems 42 must be remote from J-hook catch 46 to allow for clearance of nose 54 and floor 16 to enter concave receiving portion 48 (as seen in FIG. 5). If front pem-receiving holes 92 are of the slotted version, front pems 42 are preferably in relative close proximity to the concave receiving portion 48, as clearance is not necessary between the pem 42 and the J-hook catch 46 (as seen in FIGS. 2, 3, and 14).

Through finger pressure applied to upper end 64, spring 82 is depressed, and locking lever 62 is rotated (counterclockwise in the figures) about axle rod 60. Floor 16 is then brought in contact with rear top surface 34, with pems 42 engaging pem-receiving holes 90, 92 (as seen in FIGS. 10 and 14).

Finger pressure is released from upper end 64 allowing restoring force of spring 82 to rotate locking lever 62 (clockwise as illustrated in the figures) about axle rod 60, thereby engaging lower end 66 with ledge 52. Housing 12 is now secure from motion in the horizontal plane by pems 42 and J-hook catch 46; housing 12 is now secure from motion in the vertical direction by J-hook catch 46 and lower end 66.

To remove housing 12 from mounting bracket 18, with the exception of the fixation of mounting bracket 18 to pedestal 40, the steps of the previous two paragraphs are reversed.

As illustrated in FIGS. 16A and 16B, back wall 20 is not required to extend along the entire back of housing 12. Rather, aesthetically pleasing back-wall configurations are possible. Nonetheless, it is desirable for back wall 20, regardless of design, to be wider than locking lever 62 (as seen in FIG. 15).

Moreover, as seen in FIGS. 14 and 16B, mounting bracket 18 may be smaller in area than housing 12; such attribute allows for utilization of unencumbered portions an undersurface 96 for other purposes, such as a small light bulb 98 powered by the power source of the keyboard.

Figure 17:
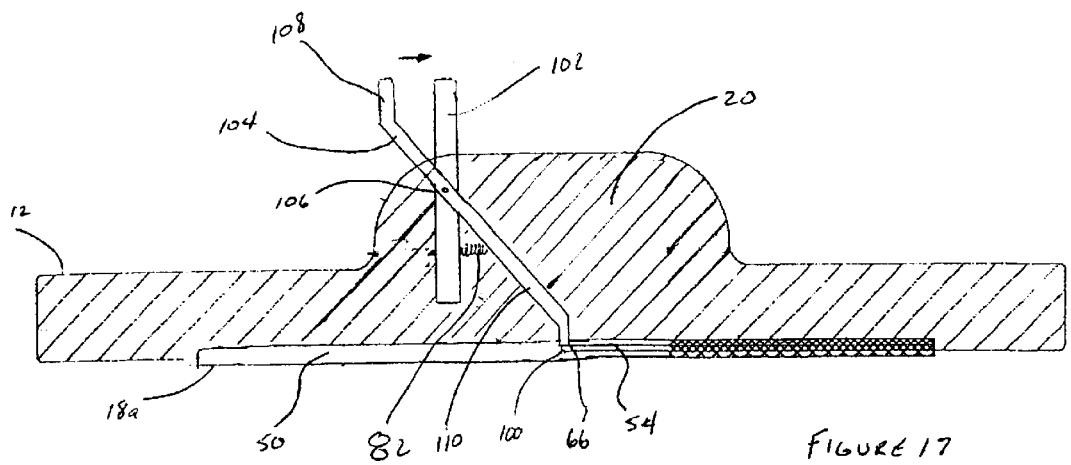
FIG. 17 is a back view of the bracket and housing of another preferred embodiment engaged.
Figure 18:
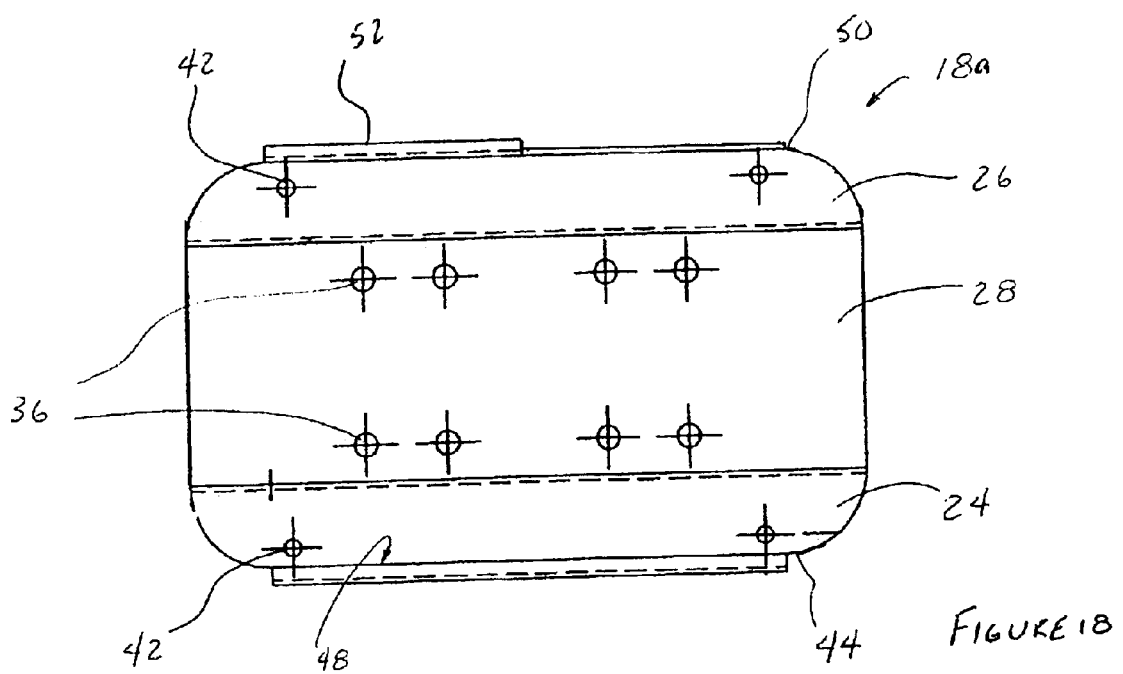
FIG. 18 is a top view of a mounting bracket for use with the embodiment depicted in FIG. 17.

FIGS. 17 and 18 illustrate another embodiment of the locking mechanism. As shown in FIG. 17, housing 12 is nestled in a mounting bracket 18a. Mounting bracket 18a is similar to mounting bracket 18 illustrated in FIG. 2, with the exception that ledge 52 does not extend along the entire upstanding back mounting edge 50 of mounting bracket 18a, but ends at a ledge terminus 100. Vertically extending is padded grip 102, which is integral with back wall 20. Pivotally attached to padded grip 102 is scissor lever 104 by means of rivet 106. A handle 108 of scissor lever 104 is designed to be dispensed from padded grip 102 no more than the distance of the palm to fist knuckle of the index finger of a statistically average patrolperson, to allow for easy grasping by the patrolperson. Squeezing handle 108 of scissor lever 104 toward padded grip 102 compresses spring 82 producing disengaging movement of a lower arm 110. Lower arm 110 has lower end 66 (as earlier seen in FIG. 6) which is hooked to engage ledge 52. As spring 82 is compressed, lower end slides off terminus 100, releasing housing 12 from mounting bracket 18a.

Figure 19:
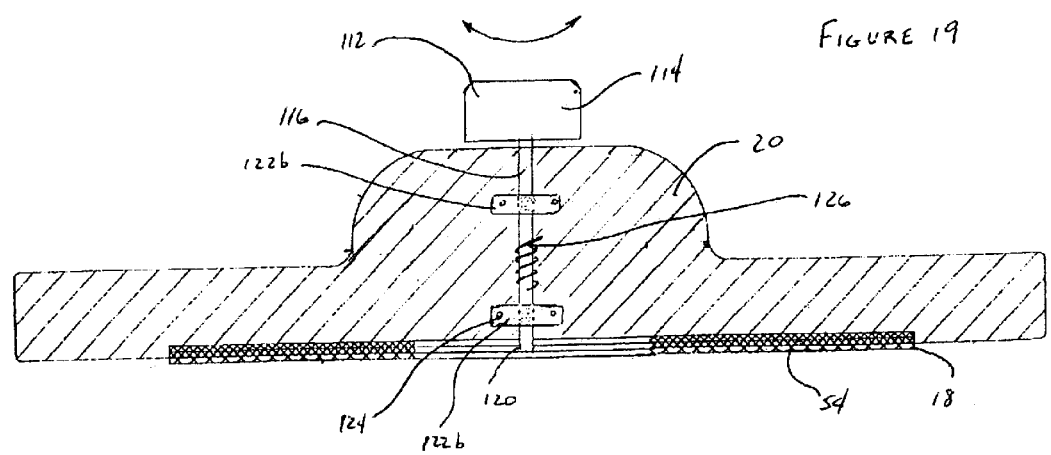
FIG. 19 is a back view of another preferred embodiment with the bracket in engagement with the housing.
Figure 20:
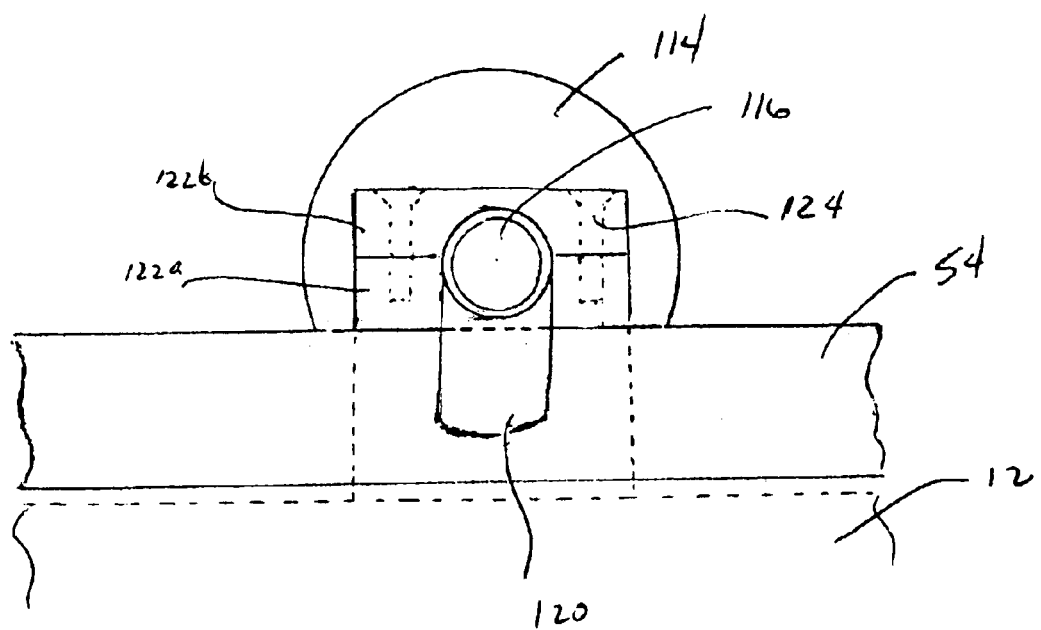
FIG. 20 is a bottom view of the locking mechanism of the embodiment depicted in FIG. 19.
Figure 21:
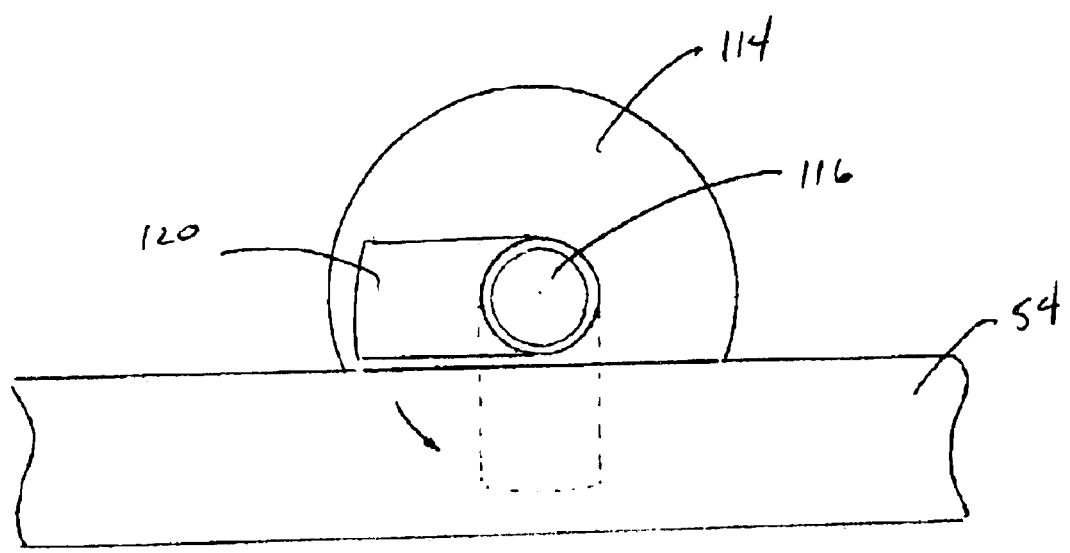
FIG. 21 is a bottom view of the locking mechanism of the embodiment depicted in FIG. 19 with attaching components removed.

In another embodiment shown in FIGS. 19 and 20, rotational motion is utilized to release housing 12 from mounting bracket 18. As shown, housing 12 is nestled in mounting bracket 18. Locking mechanism 112 is comprised of nob 114 and rotational shaft 116. Rotational shaft 116 has a catch member 120, which is similar in function to lower end 66, i.e. to engage ledge 52. Catch member 120 is integral with the lower end of rotational shaft 116. Rotational shaft 116 is affixed to back wall 20 by means of inner yoke portion and outer yoke portion, 122a and 122b respectively. Inner yoke 122a is integral with back wall 20 of housing 12. Inner yoke 122a has a semi-cylindrical notch to accommodate shaft 116. Outer yoke 122b also has a semi-cylindrical notch such that when inner and outer yoke portions 122a, 122b are affixed to each other by means of screws 124, shaft 116 may be retained in the cylindrical aperture created thereby. It is more preferable if shaft is circumferentially threaded and cylindrical aperture of affixed inner and outer yoke portions 122a, 122b have complementary circumferential threads to allow for rotation therein. As seen in FIG. 21 (with housing 12 and inner and outer yoke portions 122a, 122b removed for clarity), nob 114 may be rotated such that catch member 120 may engage ledge 52. Torsional spring 126 is affixed to shaft 116 and further engages back wall 20 such that as nob is rotated to disengage catch member 120 from ledge 52, potential energy is created in torsional spring tending to re-engage catch member 120 with ledge 52 upon release of hand pressure to nob 114. Once nob 114 causes catch member 120 to disengage ledge 52, of course, housing 12 may be released from mounting bracket 18.

While the principles of the invention have been shown and described in connection with but a few embodiments, it is to be understood clearly that such embodiments are by way of example and are not limiting.

What is claimed is:

1. A keyboard-holding device for detachably holding a keyboard of the type having keys and having a shell with a front surface, a back surface, and a bottom surface, to a support, the keyboard-holding device comprising:

a first elongate member having a first end and a second end;

a pivot located between the first end and the second end;

a locking mechanism attached with respect to the second end for unlockably locking the first elongate member to a holder, said holder fixedly attachable to the support;

a fulcrum rotatably attached with respect to the pivot and fixedly attached with respect to the shell; and an elastic device providing a restoring force tending to maintain the locking mechanism in locked engagement with the holder, but which is manipulatable to unlock the shell from the holder.

2. The keyboard-holding device of claim 1 wherein the elastic device is a coiled spring.

3. The keyboard-holding device of claim 2 further comprising a second elongate member, wherein the coiled spring is attached with respect to the first elongate member and the second elongate member.

4. The keyboard-holding device of claim 2 wherein the coiled spring is attached with respect to the shell and with respect to a portion of the first elongate member, said portion of the first elongate member being located between the second end and the pivot.

5. The keyboard-holding device of claim 2 wherein the coiled spring is attached with respect to the shell and with respect to a portion of the first elongate member, said portion of the first elongate member being located between the first end and the pivot.

6. The keyboard-holding device of claim 5 wherein the holder has a J-shaped catch for engagement with at least one of the surfaces of the shell.

7. The keyboard-holding device of claim 6 wherein the front surface is convex and dimensioned to snugly engage the J-shaped catch.

8. The keyboard-holding device of claim 7 wherein the bottom surface is configured to be complementary in shape to a discontinuous upper surface of the holder.

9. The keyboard-holding device of claim 8 wherein the upper surface of the holder has at least one pem.

* * * * *